United States Patent
Qiu et al.

(10) Patent No.: US 12,456,249 B2
(45) Date of Patent: Oct. 28, 2025

(54) VIRTUAL SCENE PLAYBACK METHOD AND APPARATUS, ELECTRONIC DEVICE, AND STORAGE MEDIUM

(71) Applicant: GOERTEK INC., Shandong (CN)

(72) Inventors: Tao Qiu, Shandong (CN); Xiangjun Zhang, Shandong (CN); Tiecun Wang, Shandong (CN); Yingshu Liu, Shandong (CN); Tingchang Lv, Shandong (CN); Kai Wang, Shandong (CN); Bin Jiang, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 200 days.

(21) Appl. No.: 18/255,413

(22) PCT Filed: Oct. 7, 2021

(86) PCT No.: PCT/CN2021/122522
§ 371 (c)(1),
(2) Date: Jun. 1, 2023

(87) PCT Pub. No.: WO2022/116679
PCT Pub. Date: Jun. 9, 2022

(65) Prior Publication Data
US 2024/0095998 A1    Mar. 21, 2024

(30) Foreign Application Priority Data
Dec. 3, 2020    (CN) .......................... 202011395016.9

(51) Int. Cl.
*G06T 15/10*    (2011.01)
*H04S 7/00*    (2006.01)

(52) U.S. Cl.
CPC ................ *G06T 15/10* (2013.01); *H04S 7/30* (2013.01); *H04S 2400/15* (2013.01)

(58) Field of Classification Search
CPC ........ G06T 15/10; H04S 7/30; H04S 2400/15
See application file for complete search history.

(56) References Cited

U.S. PATENT DOCUMENTS

2006/0130095 A1    6/2006    Willis et al.
2011/0106912 A1    5/2011    Onda et al.
(Continued)

FOREIGN PATENT DOCUMENTS

CN    102054290 A    5/2011
CN    103794102 A    5/2014
(Continued)

*Primary Examiner* — Yu Chen
(74) *Attorney, Agent, or Firm* — Ingrassia Fisher & Lorenz, LLP

(57) ABSTRACT

A virtual scene playback method is disclosed, which comprises: receiving a scene playback instruction and determining playback parameters according to the scene playback instruction, wherein the playback parameters include playback space and playback time; querying virtual space information and user model information corresponding to the playback parameters; and generating virtual scene playback content according to the virtual space information and the user model information. The present disclosure can save all the information in the virtual scene and play back the virtual scene corresponding to specific space and time. A virtual scene playback apparatus, an electronic device and a storage medium are also disclosed, which also have the above beneficial effects.

14 Claims, 4 Drawing Sheets

(56) References Cited

U.S. PATENT DOCUMENTS

| | | | |
|---|---|---|---|
| 2012/0072451 A1* | 3/2012 | Merrifield | A63F 13/533 |
| | | | 707/E17.014 |
| 2012/0188452 A1* | 7/2012 | Keiser | H04N 5/2224 |
| | | | 348/559 |
| 2012/0192115 A1* | 7/2012 | Falchuk | G06F 3/04883 |
| | | | 715/850 |
| 2014/0199043 A1* | 7/2014 | Guntur | H04N 21/4728 |
| | | | 386/230 |
| 2015/0302651 A1 | 10/2015 | Shpigelman | |
| 2017/0078819 A1* | 3/2017 | Habets | H04S 5/005 |
| 2017/0319956 A1 | 11/2017 | Vandonkelaar | |
| 2018/0373413 A1 | 12/2018 | Sawaki | |
| 2019/0262726 A1* | 8/2019 | Spencer | G06T 7/543 |
| 2020/0066022 A1* | 2/2020 | Leong | G06F 3/0482 |
| 2020/0118342 A1* | 4/2020 | Varshney | G06T 13/20 |
| 2021/0176579 A1* | 6/2021 | Laitinen | H04R 5/027 |
| 2021/0343078 A1* | 11/2021 | Shen | G06T 13/20 |
| 2021/0354036 A1* | 11/2021 | Swann | A63F 13/5258 |
| 2022/0165306 A1* | 5/2022 | Hamada | H04N 21/8456 |
| 2023/0290042 A1* | 9/2023 | Casella | G06F 11/3636 |

FOREIGN PATENT DOCUMENTS

| | | | | |
|---|---|---|---|---|
| CN | 107050850 A | | 8/2017 | |
| CN | 109254660 A | * | 1/2019 | G06F 3/011 |
| CN | 112527108 A | | 3/2021 | |
| WO | 2017020011 A1 | | 2/2017 | |

* cited by examiner

VIRTUAL SCENE PLAYBACK METHOD AND APPARATUS, ELECTRONIC DEVICE, AND STORAGE MEDIUM

CROSS-REFERENCE TO RELATED APPLICATIONS

This application is a U.S. National-Stage entry under 35 U.S.C. § 371 based on International Application No. PCT/CN2021/122522, filed Oct. 7, 2021 which was published under PCT Article 21(2) and which claims priority to Chinese Application No. 202011395016.9, filed Dec. 3, 2020, which are all hereby incorporated herein in their entirety by reference.

TECHNICAL FIELD

This application pertains to the field of virtual reality technology, in particular to a virtual scene playback method and apparatus, an electronic device and a storage medium.

BACKGROUND

With the development of virtual reality technology, more and more people begin to use VR devices and AR devices to enjoy the fun of virtual world. While virtual reality technology brings fun to users, there are also many wonderful moments worth remembering and preserving. In related technologies, wonderful moments are mainly recorded by scene screenshots, but the scene screenshots cannot retain all the information in the virtual scene.

Therefore, how to save all the information in the virtual scene and play back the virtual scene corresponding to specific space and time is currently a technical problem that needs to be solved by those skilled in the art. In addition, other objects, desirable features and characteristics will become apparent from the subsequent summary and detailed description, and the appended claims, taken in conjunction with the accompanying drawings and this background.

SUMMARY

The object of the present disclosure is to provide a virtual scene playback method and apparatus, an electronic device and a storage medium that can save all information in the virtual scene and playback the virtual scene corresponding to specific space and time.

To solve the above technical problems, the present disclosure provides a virtual scene playback method, which comprises the following steps:
  receiving a scene playback instruction and determining playback parameters according to the scene playback instruction, wherein the playback parameters include playback space and playback time;
  querying virtual space information and user model information corresponding to the playback parameters; and
  generating virtual scene playback content according to the virtual space information and the user model information.

Optionally, the step of querying virtual space information corresponding to the playback parameters comprises:
  reading a virtual space source file in a preset storage space, and determining the virtual space information corresponding to the playback parameters according to the virtual space source file, wherein the virtual space information includes scene model information and object model information.

Optionally, the step of querying user model information corresponding to the playback parameters comprises:
  generating a data download request according to the playback parameters, and sending the data download request to a server, so that the server returns the user model information corresponding to the playback parameters.

Optionally, the process of generating the user model information comprises:
  in the virtual space, constructing a user sphere having a radius of a preset length with a geometric center of the user model as the center of the sphere;
  setting more than three virtual cameras in the virtual space according to a spatial position of the user sphere, and using the virtual cameras to collect a user model action and a user model rendering layer, wherein fields of view of the virtual cameras do not intersect with the user sphere, and shooting areas of all the virtual cameras completely cover the user sphere;
  setting a virtual microphone in the virtual space according to the spatial position of the user sphere, and using the virtual microphone to collect a user voice; and
  uploading the user model action, the user model rendering layer and the user voice to the server as the user model information.

Optionally, the step of generating virtual scene playback content according to the virtual space information and the user model information comprises:
  generating a spatial display sequence of scene models and object models corresponding to the virtual spatial information in chronological order;
  generating a user display sequence of user model actions and user model rendering layers corresponding to the user model information in chronological order; and
  synthesizing the virtual scene playback content according to the spatial display sequence and the user display sequence.

Optionally, the process of generating the scene playback instruction comprises:
  receiving a search target word input by the user in a search area, wherein the search target word includes a model name and/or voice content;
  querying a playback resource in the server corresponding to the search target word, and displaying a resource attribute of the playback resource, wherein the resource attribute includes any one or any combination of time information, space information and user information; and
  generating the scene playback instruction according to the resource attribute of the playback resource selected by the user.

Optionally, after the step of generating virtual scene playback content according to the virtual space information and the user model information, the method further comprises:
  setting a corresponding rendering camera for each model in the virtual space, and generating a playback picture corresponding to the virtual scene playback content according to the user's current position.

The present disclosure also provides a virtual scene playback apparatus, which comprises:
  a playback parameter determination module for receiving a scene playback instruction and determining playback parameters according to the scene playback instruction, wherein the playback parameters include playback space and playback time;

an information query module for querying virtual space information and user model information corresponding to the playback parameters; and a playback module for generating virtual scene playback content according to the virtual space information and the user model information.

The present disclosure also provides a storage medium having computer programs stored thereon. When the computer programs are executed, the steps of the above virtual scene playback method are implemented.

The present disclosure also provides an electronic device, which comprises a memory and a processor. A computer program is stored in the memory, and when the processor calls the computer program in the memory, the steps of the above virtual scene playback method are implemented.

The present disclosure provides a virtual scene playback method, which comprises: receiving a scene playback instruction and determining playback parameters according to the scene playback instruction, wherein the playback parameters include playback space and playback time; querying virtual space information and user model information corresponding to the playback parameters; and generating virtual scene playback content according to the virtual space information and the user model information.

After receiving the scene playback instruction, the present disclosure determines the playback parameters according to the scene playback instruction. The playback parameters include the playback space and playback time, that is, the virtual scene to be played back is a virtual scene corresponding to the playback space and playback time. Since the virtual scene to be played back includes information of the virtual space itself and information of the user model, the present disclosure queries the corresponding virtual space information and user model information according to the playback parameters, and then generates the corresponding virtual scene playback content based on the virtual space information and user model information. The present disclosure reconstructs the virtual scene corresponding to the playback parameters in the way of scene reproduction, which can save all information in the virtual scene and realize the playback of the virtual scene corresponding to specific space and time. The present disclosure also provides a virtual scene playback apparatus, an electronic device and a storage medium, which have the above beneficial effects, and will not be repeated here.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described below with reference to the drawings in the embodiments of the present disclosure. Obviously, the embodiments as described are merely part of, rather than all, embodiments of the present disclosure. Based on the embodiments of the present disclosure, any other embodiment obtained by a person of ordinary skill in the art without paying any creative effort shall fall within the protection scope of the present disclosure.

Figure 1:
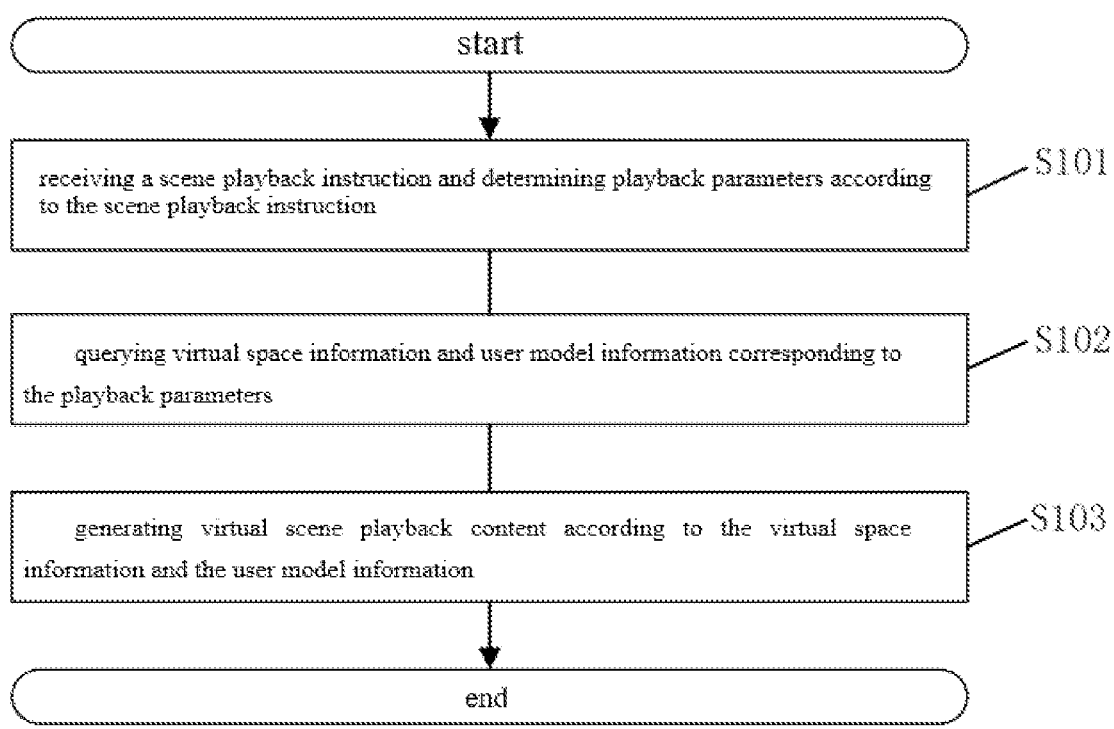
FIG. 1 is a flow chart of a virtual scene playback method according to an embodiment of the present disclosure.

Please refer to FIG. 1, which is a flow chart of a virtual scene playback method according to the embodiment of the present disclosure.

Specifically, the method may comprise the following steps:

S101: receiving a scene playback instruction and determining playback parameters according to the scene playback instruction;

This embodiment can be applied to VR devices or AR devices. VR devices or AR devices can display pictures through the display device, and can also display pictures within a historical time period after receiving the scene playback instruction.

The scene playback instruction is an instruction which is used to play the virtual scene when any user uses a VR device or an AR device in a historical time period. For example, a user A played a VR game with the VR device from 8:00 to 8:20, and a user B can view the user A's playing process from 8:00 to 8:20 through the scene playback instruction at 9:00.

After receiving the scene playback instruction, the scene playback instruction may be parsed to obtain playback parameters, which may include playback space and playback time. The playback space refers to the location of the content to be played back in the scene, and the playback time refers to the time period corresponding to the content to be played back.

S102: querying virtual space information and user model information corresponding to the playback parameters;

After obtaining the playback parameters, this embodiment can query the virtual space information and user model information corresponding to the playback parameters. When the user uses a VR device or an AR device, he or she observes and experiences the virtual space from the viewing angle of the user model. The virtual space information refers to the information of other models in the virtual world except user models, such as scene models, object models, etc. This information may include layer information, motion information, sound information, etc. The virtual space information is the information contained in the virtual space source file in advance, such as the color of the sky, the flying action of birds, etc. The user model information is the layer information, motion information and voice information of the user model. The user model information changes with the user's operation.

Further, since the virtual space information is the information contained in the virtual space source file in advance, the virtual space information can be acquired locally; the user model information may be the information generated when other users use the device, so the user model information can be downloaded from the server. As a feasible implementation, the process of querying the virtual space information corresponding to the playback parameters may comprise: reading a virtual space source file in a preset storage space, and determining the virtual space information corresponding to the playback parameters according to the virtual space source file. The virtual space information includes scene model information and object model information. The virtual space source file is a file for generating the virtual space. As another feasible implementation, the process of querying the user model information corresponding to the playback parameters comprises: generating a data download request according to the playback parameters, and sending the data download request to a server, so that the server returns the user model information corresponding to the playback parameters.

S103: generating virtual scene playback content according to the virtual space information and the user model information.

After obtaining the virtual space information, this embodiment can generate the virtual scene in the virtual space except the user model according to the virtual space information, and can also add the user model in the virtual scene according to the user model information, thereby obtaining the virtual scene playback content. As a very feasible implementation, this embodiment can generate the virtual scene playback content in the following ways: generating a spatial display sequence of scene models and object models corresponding to the virtual spatial information in chronological order; generating a user display sequence of user model actions and user model rendering layers corresponding to the user model information in chronological order; and synthesizing the virtual scene playback content according to the spatial display sequence and the user display sequence.

After receiving the scene playback instruction, this embodiment determines the playback parameters according to the scene playback instruction. The playback parameters include the playback space and playback time, that is, the virtual scene to be played back is a virtual scene corresponding to the playback space and playback time. Since the virtual scene to be played back includes information of the virtual space itself and information of the user model, this embodiment queries the corresponding virtual space information and user model information according to the playback parameters, and then generates the corresponding virtual scene playback content based on the virtual space information and user model information. This embodiment reconstructs the virtual scene corresponding to the playback parameters in the way of scene reproduction, which can save all information in the virtual scene and realize the playback of the virtual scene corresponding to specific space and time.

Figure 2:
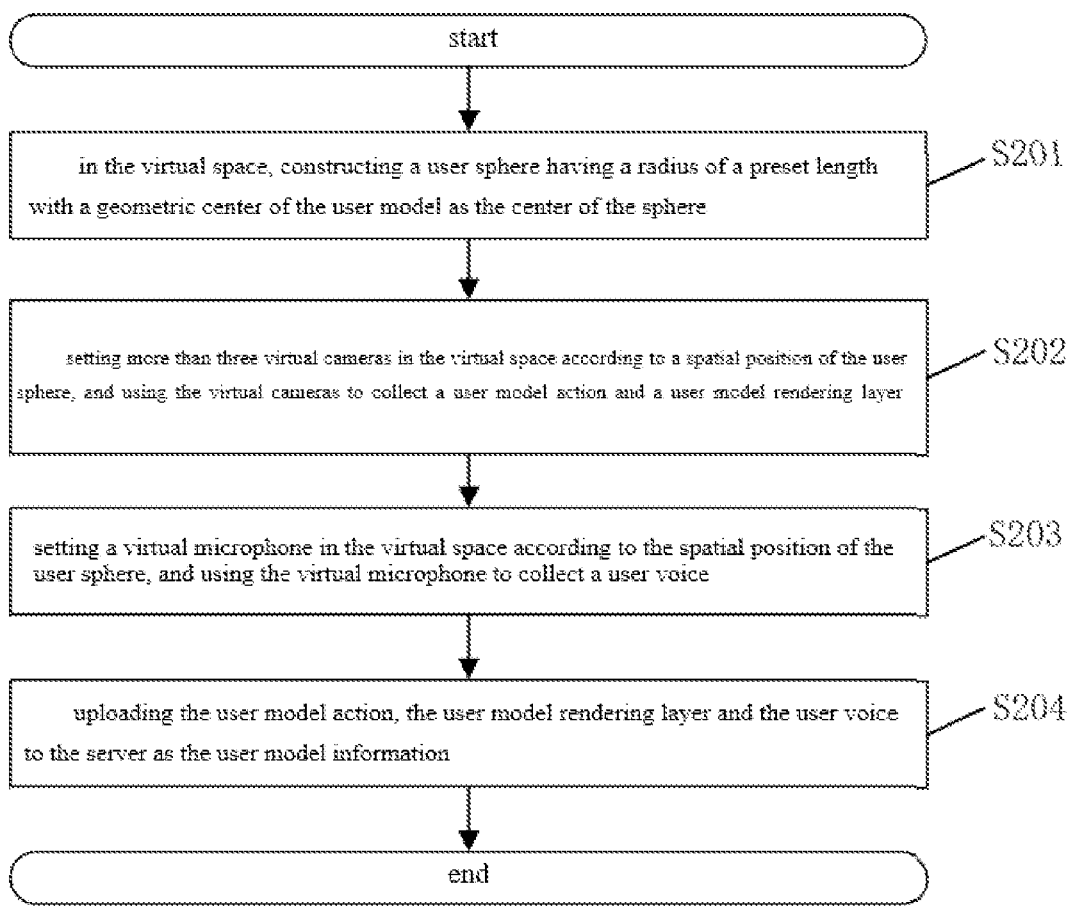
FIG. 2 is a flow chart of a method for generating user model information according to an embodiment of the present disclosure.

Please refer to FIG. 2, which is a flow chart of a method for generating the user model information according to an embodiment of the present disclosure. This embodiment is a specific description of the process of generating the user model information mentioned in the corresponding embodiment of FIG. 1. This embodiment can be combined with the corresponding embodiment of FIG. 1 to further obtain an embodiment. This embodiment may comprise the following steps:

S201: in the virtual space, constructing a user sphere having a radius of a preset length with a geometric center of the user model as the center of the sphere;

The user sphere constructed in this step completely contains the user model. The user sphere is used to collect the user model information, so the user sphere may have no color.

Figure 3:
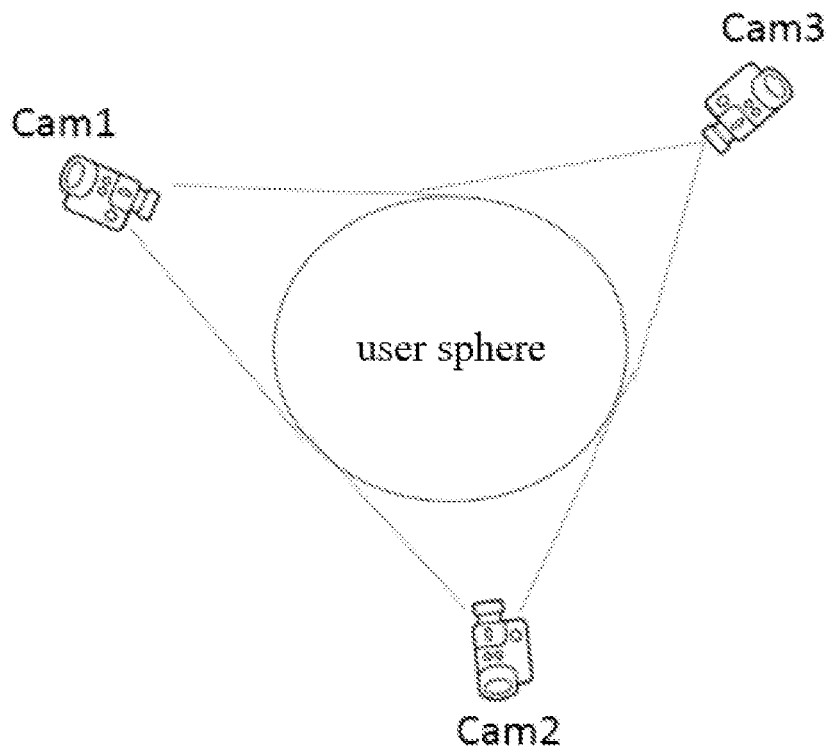
FIG. 3 is a schematic diagram of the layout of virtual cameras according to an embodiment of the present disclosure.

S202: setting more than three virtual cameras in the virtual space according to a spatial position of the user sphere, and using the virtual cameras to collect a user model action and a user model rendering layer;

Please refer to FIG. 3, which is a schematic diagram of the layout of virtual cameras according to an embodiment of the present disclosure. In this embodiment, the positions of the virtual cameras are set according to a user sphere distance rule, so that the fields of view of the virtual cameras do not intersect with the user sphere, and the shooting areas of all virtual cameras completely covers the user sphere. Cam 1, Cam 2 and Cam 3 in FIG. 3 are virtual cameras. The user model action may include user actions when using VR devices, such as walking, jumping, turning head, etc. The user model rendering layer refers to the position relationship and map information of the rendering layer at each position of the user model.

S203: setting a virtual microphone in the virtual space according to the spatial position of the user sphere, and using the virtual microphone to collect a user voice;

In this embodiment, the microphone for collecting voice can be set in the VR device or AR device, the actual collected voice can be converted to the user voice collected by the virtual microphone according to the position relationship between the virtual microphone and the user model. The user voice collected by the virtual microphone can be obtained through the above conversion according to the relationship between the distance to the sound source and the sound intensity attenuation.

S204: uploading the user model action, the user model rendering layer and the user voice to the server as the user model information.

After obtaining the user model action, user model rendering layer and user voice, they may be aligned in the time dimension, and the aligned user model action, user model rendering layer and user voice may be uploaded to the server as the user model information. When uploading to the server, the space and time corresponding to the user model information may be uploaded together.

As a further introduction to the corresponding embodiment in FIG. 1, the scene playback instructions may be generated in the following ways: receiving a search target word input by the user in a search area, wherein the search target word includes a model name and/or voice content; querying a playback resource in the server corresponding to the search target word, and displaying a resource attribute of the playback resource, wherein the resource attribute includes any one or any combination of time information, space information and user information; and generating the scene playback instruction according to the resource attribute of the playback resource selected by the user.

The playback resource includes any quantity of user model information matching with the search keywords, and the resource attributes of each playback resource are displayed for users to select. In the above embodiment, the scene playback instruction may be generated according to the time information, space information and user information corresponding to the playback resource selected by the user. At this moment, the scene playback instruction generated is an instruction for generating the virtual scene content of a specific user at a specific time and space.

Further, after generating the virtual scene playback content according to the virtual space information and the user model information, a corresponding rendering camera may be set for each model in the virtual space, and a playback picture corresponding to the virtual scene playback content may be generated according to the current position of the user.

Figure 4:
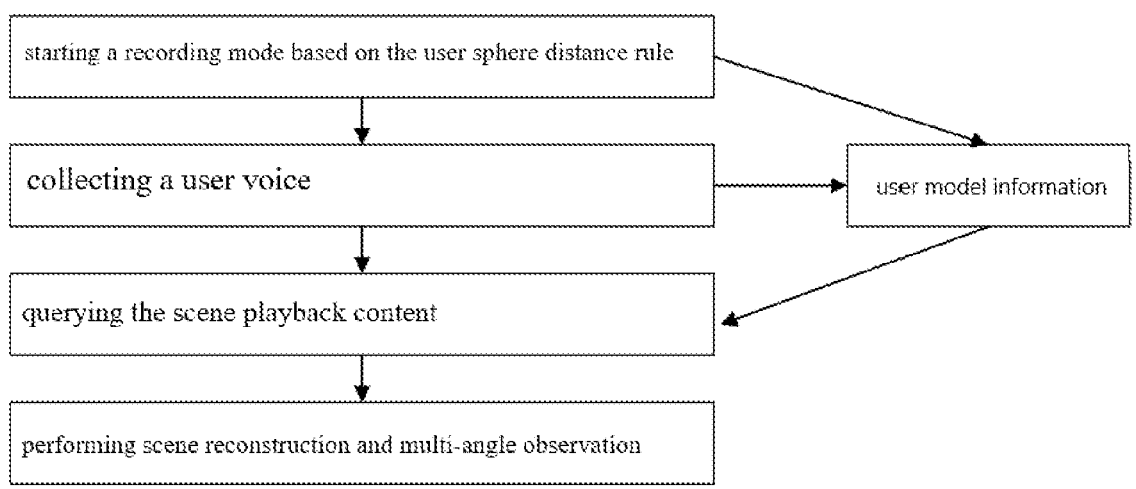
FIG. 4 is a flow chart of an AR or VR method for searching digital enhanced content according to an embodiment of the present disclosure.

The process flow described in the above embodiment will be described below through an example in practical use. Please refer to FIG. 4, which is a flow chart of an AR and VR method for searching digital enhanced content according to the embodiment of the present disclosure. This embodiment can meet the requirements of users to record wonderful interactions in the virtual world and query the interest records of their own or disclosed by other people. It uses 3D full-scene multi-angle substitution experience, makes virtual reality users better immerse in the virtual world, and thus improves the virtual reality experience of users. This embodiment may comprise the following steps:

Step 1: starting a recording mode based on the user sphere distance rule;

The main function of the user sphere distance rule is to realize the function of monitoring scene changes. In this embodiment, the scene is divided into regions and covered by the monitoring network according to the distance rules of the user model, which can ensure that when the region recording function takes effect, the location layout of three virtual camera models with wonderful moment records in the region takes precedence over the object distribution in the scene, they will record and save the actions of scene character models and the rendering layers. The saving rule is to record the actions of the user model in real time and save them on the server.

Step 2: collecting a user voice;

The sound information in the scene is also collected through the virtual microphone of the scene, and the recording file is uploaded to and saved on the server.

Figure 5:
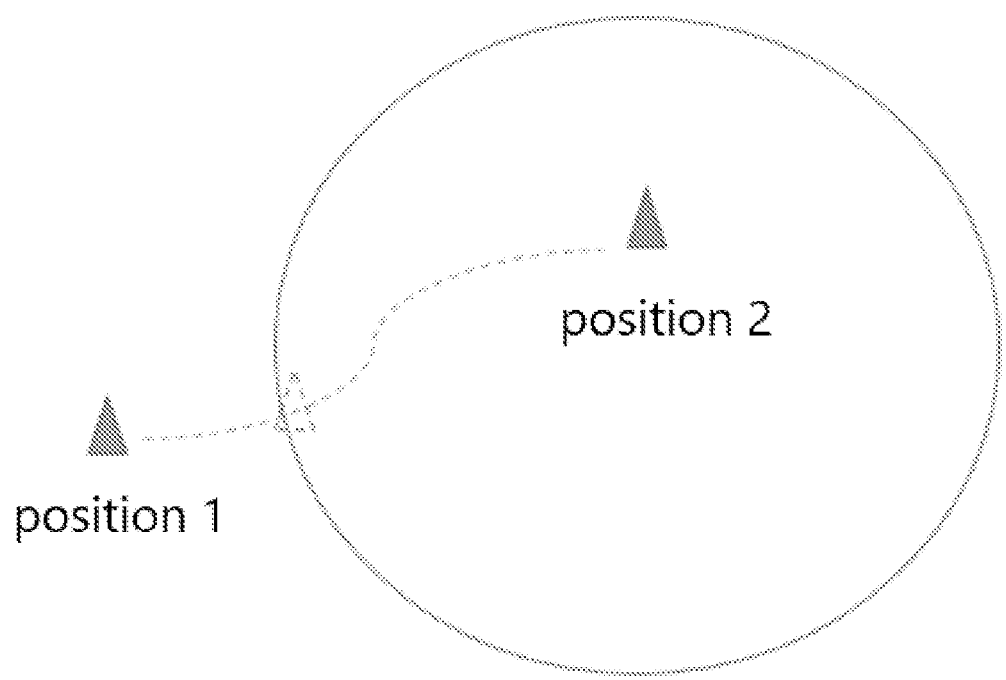
FIG. 5 is a schematic diagram of moving path intersection according to an embodiment of the present disclosure.

Step 3: querying the scene playback content;

The user may input the information of an object in a region to be acquired in the search area by controlling the cursor with the handle or eye, so as to compare it with the search resources on the server. The comparison search rule involves the objects that have appeared in the playback space and playback time, which include the objects whose moving path have intersected with the playback space. Specifically, in this embodiment, it can be confirmed and returned by whether the object path information and user scene information have intersections. As shown in FIG. 5, which is a schematic diagram of moving path intersection according to an embodiment of the present disclosure, the dotted line in FIG. 5 represents the moving path of the search scene object moving from position 2 to position 1, and the circle represents the region within the distance rule of the user model at that moment. As long as there is path intersection between them, they meet the user's query rules, and then return the corresponding query content for scene reconstruction and multi-view experience in the step 4.

Step 4: performing scene reconstruction and multi-view observation.

The scene reconstruction mainly includes three tasks: first, obtaining the motion information (skeleton motion, movement trajectory, etc.) of all model objects in the scene for a period of time, and generating the action sequence in chronological order; second, according to the scene information recorded by three recording cameras, the actions of character models are supplemented to the scene; third, scene traversal, i.e., traversing to the copy space of the current scene according to the model location found (full scene copy, without affecting the current user's use). At this moment, each object in the scene has a rendering virtual camera to meet the user's multi-view observation.

The AR and VR methods for searching digital enhanced content according to this embodiment can support the following functions: recording of wonderful moments, which can record object models, scene models and user models; input support for multiple query resources (such as object model and voice keywords), i.e., when the query results are obtained, scene traversing can be performed, and multi-view observations can be performed on the objects in the scene. The implementation of this embodiment can enable users to keep the records of wonderful scenes or valuable scenes at any time when experiencing virtual reality, so that they can consult and share later, and thus users can deeply immerse in the experience of virtual reality.

Figure 6:
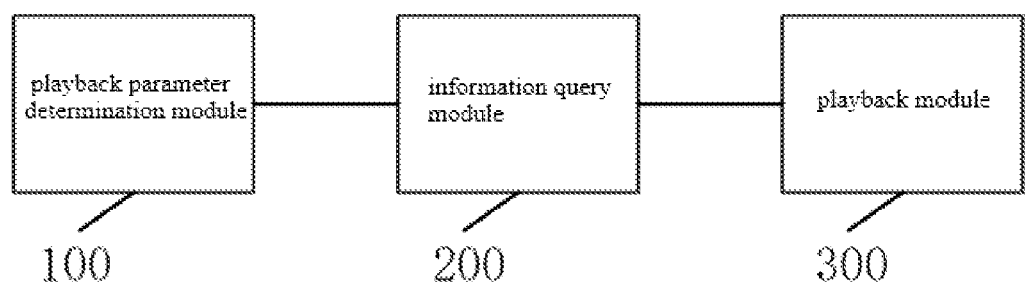
FIG. 6 is a schematic diagram of the structure of a virtual scene playback apparatus according to an embodiment of the present disclosure.

Please refer to FIG. 6, which is a schematic diagram of the structure of a virtual scene playback apparatus according to the embodiment of the present disclosure.

The apparatus may comprise:

a playback parameter determination module 100 for receiving a scene playback instruction and determining playback parameters according to the scene playback instruction, wherein the playback parameters include playback space and playback time;

an information query module 200 for querying virtual space information and user model information corresponding to the playback parameters; and a playback module 300 for generating virtual scene playback content according to the virtual space information and the user model information.

After receiving the scene playback instruction, this embodiment determines the playback parameters according to the scene playback instruction. The playback parameters include the playback space and playback time, that is, the virtual scene to be played back is a virtual scene corresponding to the playback space and playback time. Since the virtual scene to be played back includes information of the virtual space itself and information of the user model, this embodiment queries the corresponding virtual space information and user model information according to the playback parameters, and then generates the corresponding virtual scene playback content based on the virtual space information and user model information. This embodiment reconstructs the virtual scene corresponding to the playback parameters in the way of scene reproduction, which can save all information in the virtual scene and realize the playback of the virtual scene corresponding to specific space and time.

Optional, the information query module 200 comprises:

a virtual space information query unit for reading a virtual space source file in a preset storage space, and determining the virtual space information corresponding to the playback parameters according to the virtual space source file, wherein the virtual space information includes scene model information and object model information; and a user model information query unit for generating a data download request according to the playback parameters, and sending the data download request to a server, so that the server returns the user model information corresponding to the playback parameters.

Further, it further comprises: a user model information generation module for in the virtual space, constructing a user sphere having a radius of a preset length with a geometric center of the user model as the center of the sphere;

setting more than three virtual cameras in the virtual space according to a spatial position of the user sphere, and using the virtual cameras to collect a user model action and a user model rendering layer, wherein fields of view of the virtual cameras do not intersect with the user sphere, and shooting areas of all the virtual cameras completely cover the user sphere;

setting a virtual microphone in the virtual space according to the spatial position of the user sphere, and using the virtual microphone to collect a user voice; and uploading the user model action, the user model rendering layer and the user voice to the server as the user model information.

Further, the playback module 300 comprises:

a spatial display sequence generation unit for generating a spatial display sequence of scene models and object models corresponding to the virtual spatial information in chronological order;

a user display sequence generation unit for generating a user display sequence of user model actions and user model rendering layers corresponding to the user model information in chronological order; and a synthesizing unit for synthesizing the virtual scene playback content according to the spatial display sequence and the user display sequence.

Further, it further comprises:

a scene playback instruction generation module for: receiving a search target word input by the user in a search area, wherein the search target word includes a model name and/or voice content; querying a playback resource in the server corresponding to the search target word, and displaying a resource attribute of the playback resource, wherein the resource attribute includes any one or any combination of time information, space information and user information; and generating the scene playback instruction according to the resource attribute of the playback resource selected by the user.

Further, it further comprises:

a rendering module for, after generating virtual scene playback content according to the virtual space information and the user model information, setting a corresponding rendering camera for each model in the virtual space, and generating a playback picture corresponding to the virtual scene playback content according to the user's current position.

Since the embodiments of the apparatus part correspond to the embodiments of the method part, as for the embodiments of the apparatus part, please refer to the description of the embodiments of the method part, and will not be repeated here.

The present disclosure also provides a storage medium on which a computer program is stored. When the computer program is executed, the steps provided in the above embodiment can be implemented. The storage media may comprise: USB flash disk, removable hard disk, Read-Only Memory (ROM), Random Access Memory (RAM), disk or optical disk and other media that can store program code.

The present disclosure also provides an electronic device, which may comprise a memory and a processor. The memory has a computer program stored thereon. When the processor calls the computer program in the memory, it can implement the steps provided in the above embodiment. Of course, the electronic device may further comprise various network interfaces, power supplies and other components.

The embodiments in this specification are described in a parallel or progressive manner. Each embodiment focuses on the differences from other embodiments. The same or similar parts of each embodiment may be referred by each other. As for the devices disclosed in the embodiments, since they correspond to the methods disclosed in the embodiments, their description is relatively simple, and relevant parts may refer to the description of the method part.

Those skilled in the art will also understand that the units and algorithm steps of the examples described in conjunction with the embodiments disclosed herein can be implemented in electronic hardware, computer software or a combination thereof. In order to clearly illustrate the interchangeability of hardware and software, the composition and steps of the examples have been generally described in the above description according to functions. Whether these functions are implemented in hardware or software depends on the specific application and design constraints of the technical solution. Those skilled in the art may use different methods to realize the described functions for each specific application, but such realization shall not be considered beyond the scope of the present disclosure.

The steps of a method or algorithm described in conjunction with the embodiments disclosed herein may be directly implemented by hardware, by software module executed by a processor, or by a combination of hardware and software. The software module may be placed in a random access memory (RAM), an internal memory, read only memory (ROM), an electrically programmable ROM, an electrically erasable programmable ROM, a register, a hard disk, a removable disk, a CD-ROM, or any other form of storage medium known in the art.

It should also be noted that, relational terms such as first and second used herein are only to distinguish one entity or operation from another, and do not necessarily require or imply that there is such actual relationship or order among those entities or operations. Moreover, the terms "comprise", "include" or any other variants are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article or apparatus including the element.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A virtual scene playback method, comprising the following steps:

receiving a scene playback instruction and determining playback parameters according to the scene playback instruction, wherein the playback parameters include playback space and playback time;

querying virtual space information and user model information corresponding to the playback parameters; and
generating virtual scene playback content according to the virtual space information and the user model information,
the step of querying user model information corresponding to the playback parameters comprises:
generating a data download request according to the playback parameters, and sending the data download request to a server, so that the server returns the user model information corresponding to the playback parameters,
wherein a process of generating the user model information comprises:
in the virtual space, constructing a user sphere having a radius of a preset length with a geometric center of the user model as a center of the sphere;
using a user sphere distance rule, setting more than three virtual cameras in the virtual space according to a spatial position of the user sphere, and using the virtual cameras to collect a user model action and a user model rendering layer, and uploading the user sphere distance rule, wherein fields of view of the virtual cameras do not intersect with the user sphere, and shooting areas of all the virtual cameras completely cover the user sphere;
setting a virtual microphone in the virtual space according to the spatial position of the user sphere, and using the virtual microphone to collect a user voice; and
uploading the user model action, the user model rendering layer and the user voice to the server as the user model information,
querying virtual space information and user model information corresponding to the playback parameters comprises: when there is a path intersection between the moving path of a search scene object and a region of the user sphere distance rule, then return the corresponding query content.

2. The virtual scene playback method according to claim 1, wherein the step of querying virtual space information corresponding to the playback parameters comprises:
reading a virtual space source file in a preset storage space, and determining the virtual space information corresponding to the playback parameters according to the virtual space source file, wherein the virtual space information includes scene model information and object model information.

3. The virtual scene playback method according to claim 1, wherein the step of generating virtual scene playback content according to the virtual space information and the user model information comprises:
generating a spatial display sequence of scene models and object models corresponding to the virtual spatial information in chronological order;
generating a user display sequence of user model actions and user model rendering layers corresponding to the user model information in chronological order; and
synthesizing the virtual scene playback content according to the spatial display sequence and the user display sequence.

4. The virtual scene playback method according to claim 1, wherein a process of generating the scene playback instruction comprises:
receiving a search target word input by the user in a search area, wherein the search target word includes a model name and/or voice content;
querying a playback resource in the server corresponding to the search target word, and displaying a resource attribute of the playback resource, wherein the resource attribute includes any one or any combination of time information, space information and user information; and
generating the scene playback instruction according to the resource attribute of the playback resource selected by the user.

5. The virtual scene playback method according to claim 1, wherein after the step of generating virtual scene playback content according to the virtual space information and the user model information, the method further comprises:
setting a corresponding rendering camera for each model in the virtual space, and generating a playback picture corresponding to the virtual scene playback content according to a user's current position.

6. The virtual scene playback method according to claim 2, wherein after the step of generating virtual scene playback content according to the virtual space information and the user model information, the method further comprises:
setting a corresponding rendering camera for each model in the virtual space, and generating a playback picture corresponding to the virtual scene playback content according to a user's current position.

7. The virtual scene playback method according to claim 3, wherein after the step of generating virtual scene playback content according to the virtual space information and the user model information, the method further comprises:
setting a corresponding rendering camera for each model in the virtual space, and generating a playback picture corresponding to the virtual scene playback content according to a user's current position.

8. The virtual scene playback method according to claim 4, wherein after the step of generating virtual scene playback content according to the virtual space information and the user model information, the method further comprises:
setting a corresponding rendering camera for each model in the virtual space, and generating a playback picture corresponding to the virtual scene playback content according to a user's current position.

9. A virtual scene playback apparatus, comprising:
a playback parameter determination module for receiving a scene playback instruction and determining playback parameters according to the scene playback instruction, wherein the playback parameters include playback space and playback time;
an information query module for querying virtual space information and user model information corresponding to the playback parameters; and
a playback module for generating virtual scene playback content according to the virtual space information and the user model information,
wherein, information query module generates a data download request according to the playback parameters, and sends the data download request to a server, so that the server returns the user model information corresponding to the playback parameters,
wherein in the virtual scene playback apparatus,
in the virtual space, constructing a user sphere having a radius of a preset length with a geometric center of the user model as a center of the sphere;
using a user sphere distance rule, setting more than three virtual cameras in the virtual space according to a spatial position of the user sphere, and using the virtual cameras to collect a user model action and a user model rendering layer, and uploading the user sphere distance rule, wherein fields of view of the virtual cameras do not intersect with the user sphere, and shooting areas of all the virtual cameras completely cover the user sphere;

setting a virtual microphone in the virtual space according to the spatial position of the user sphere, and using the virtual microphone to collect a user voice; and uploading the user model action, the user model rendering layer and the user voice to the server as the user model information, when there is a path intersection between the moving path of a search scene object and a region of the user sphere distance rule, the information query module returns the corresponding query content.

10. An electronic device, comprising: a memory and a processor, wherein a computer program is stored in the memory, and the processor calls the computer program in the memory to implement the steps of the virtual scene playback method according to claim 1.

11. An electronic device, comprising: a memory and a processor, wherein a computer program is stored in the memory, and the processor calls the computer program in the memory to implement the steps of the virtual scene playback method according to claim 2.

12. An electronic device, comprising: a memory and a processor, wherein a computer program is stored in the memory, and the processor calls the computer program in the memory to implement the steps of the virtual scene playback method according to claim 3.

13. An electronic device, comprising: a memory and a processor, wherein a computer program is stored in the memory, and the processor calls the computer program in the memory to implement the steps of the virtual scene playback method according to claim 4.

14. An electronic device, comprising: a memory and a processor, wherein a computer program is stored in the memory, and the processor calls the computer program in the memory to implement the steps of the virtual scene playback method according to claim 5.

* * * * *